(12) United States Patent
Bohnert et al.

(10) Patent No.: US 9,580,839 B2
(45) Date of Patent: Feb. 28, 2017

(54) METHODS OF MAKING CARBON FIBER FROM ASPHALTENES

(71) Applicant: Honeywell Federal Manufacturing & Technologies, LLC, Kansas City, MO (US)

(72) Inventors: George Bohnert, Harrisonville, MO (US); Daniel E. Bowen, III, Olathe, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 600 days.

(21) Appl. No.: 13/727,249

(22) Filed: Dec. 26, 2012

(65) Prior Publication Data

US 2014/0175688 A1    Jun. 26, 2014

(51) Int. Cl.
| | | |
|---|---|---|
| *C01B 31/08* | (2006.01) | |
| *D01F 9/155* | (2006.01) | |
| *C01B 31/04* | (2006.01) | |
| *C04B 35/52* | (2006.01) | |
| *C01B 31/00* | (2006.01) | |
| *D01F 9/145* | (2006.01) | |

(52) U.S. Cl.
CPC .............. *D01F 9/155* (2013.01); *C01B 31/00* (2013.01); *C01B 31/04* (2013.01); *C01B 31/089* (2013.01); *C04B 35/52* (2013.01); *C04B 35/521* (2013.01); *C04B 35/522* (2013.01); *D01F 9/145* (2013.01)

(58) Field of Classification Search
CPC ......... D01F 9/155; D01F 9/145; C01B 31/00; C01B 31/04; C01B 31/089; C04B 35/52; C04B 35/521; C04B 35/522
USPC ......... 264/29.1, 29.2, 211.1, 211.11, 211.12, 264/211.14, 172.17, 83
See application file for complete search history.

(56) References Cited

U.S. PATENT DOCUMENTS

| | | | | |
|---|---|---|---|---|
| 3,592,761 | A * | 7/1971 | Cole et al. | 208/108 |
| 3,595,946 | A * | 7/1971 | Joo et al. | 423/447.6 |
| 3,639,953 | A * | 2/1972 | Kimura et al. | 423/447.6 |
| 3,718,493 | A * | 2/1973 | Joo et al. | 106/273.1 |
| 3,767,741 | A | 10/1973 | Toyoguchi et al. | |
| 4,018,663 | A * | 4/1977 | Karr, Jr. | 208/413 |
| 4,312,742 | A * | 1/1982 | Hayashi | C10C 3/00 208/131 |
| 4,427,531 | A * | 1/1984 | Dickakian | C10C 3/00 208/309 |
| 4,518,483 | A | 5/1985 | Dickakian | |
| 4,548,703 | A * | 10/1985 | Dickakian | D01F 9/155 208/22 |
| 4,750,985 | A * | 6/1988 | Aldridge et al. | 208/53 |
| 4,810,437 | A * | 3/1989 | Izumi et al. | 264/29.2 |
| 5,286,371 | A * | 2/1994 | Goval | C10G 69/00 208/131 |

(Continued)

OTHER PUBLICATIONS

Fei et al., "Carbon Fibers and Activated Carbon Fibers from Residual Shale Oil," 1993.

(Continued)

*Primary Examiner* — Seyed Masoud Malekzadeh
(74) *Attorney, Agent, or Firm* — Hovey Williams LLP (57) ABSTRACT

Making carbon fiber from asphaltenes obtained through heavy oil upgrading. In more detail, carbon fiber is made from asphaltenes obtained from heavy oil feedstocks undergoing upgrading in a continuous coking reactor.

19 Claims, 4 Drawing Sheets

(56) References Cited

U.S. PATENT DOCUMENTS

| | | | | |
|---|---|---|---|---|
| 5,468,546 | A * | 11/1995 | Loftus et al. | 442/180 |
| 5,494,728 | A * | 2/1996 | Vermilion et al. | 428/143 |
| 5,718,787 | A * | 2/1998 | Gallagher et al. | 156/62.4 |
| 5,888,469 | A * | 3/1999 | Stiller | C01B 31/00 423/445 R |
| 6,183,854 | B1 * | 2/2001 | Stiller | B82Y 30/00 428/312.2 |
| 6,506,354 | B1 * | 1/2003 | Stiller | C01B 31/00 423/445 R |
| 6,544,491 | B1 * | 4/2003 | Stiller | C01B 31/00 423/445 R |
| 2007/0144944 | A1 * | 6/2007 | Del Bianco et al. | 208/435 |
| 2010/0258265 | A1 * | 10/2010 | Karanikas | E21B 43/243 165/45 |
| 2012/0076703 | A1 * | 3/2012 | Stiller | C10B 43/14 422/187 |
| 2012/0091042 | A1 * | 4/2012 | Stiller | C10G 1/002 208/435 |
| 2012/0091043 | A1 * | 4/2012 | Stiller | C10G 1/002 208/435 |

OTHER PUBLICATIONS

Natarajan et al., "Preparation of Solid and Hollow Asphaltene Fibers by Single Step Electrospinning," Journal of Engineered Fibers and Fabrics. 2011.

* cited by examiner

METHODS OF MAKING CARBON FIBER FROM ASPHALTENES

GOVERNMENT FUNDING

The present invention was developed with support from the U.S. government under a contract with the United States Department of Energy, Contract No. DE-NA0000622. Accordingly, the U.S. government has certain rights in the present invention.

BACKGROUND OF THE INVENTION

Field of the Invention

Embodiments of the present invention are directed to methods of making carbon fiber from asphaltenes. In more detail, embodiments of the present invention are directed to methods of making carbon fiber from asphaltenes obtained from heavy oil feedstocks undergoing upgrading in a coking reactor.

Description of Related Art

Carbon fiber comes in several forms and has found wide applicability in military, aerospace, and energy applications primarily because of its extremely high tensile strength per unit weight, anisotropically along the length of the fiber. Carbon fiber also has the significant potential to reduce weight and energy requirements of vehicles, however, it has not to this point been widely adopted in the automotive industry, in part, because of the high cost associated with obtaining and preparing carbon fiber precursors.

Various precursors are currently used to produce carbon fibers of different morphologies and characteristics. Typical precursors include polyacrylonitrile (PAN), cellulosic fibers (e.g., rayon, cotton), petroleum or coal tar pitch, and certain phenolic fibers. Carbon fibers are generally manufactured from these precursors by the controlled pyrolysis of the precursors into fibrous form. The carbon fiber yield will depend on the precursor material. However, a typical PAN precursor will give a carbon fiber yield of about 50% of the mass of the original PAN.

In addition to the precursors listed above, a poorly understood and little-known carbon fiber precursor, asphaltene, may also be used in the production of carbon fibers. Large amounts of asphaltenes are currently being produced from the heavy oils that are mined from heavy oil sand deposits, such as from the Alberta oil sands near Fort McMurray, Canada. In addition to the large amounts of asphaltenes being generated from oil sand deposits, the asphaltenes contained within mined heavy oils typically include hydrogen to carbon ratios from approximately 1:1 to 1.2:1. Such low ratios promote carbon fiber strength and yield because outgassing is reduced during carbon fiber processing.

Asphaltenes are generally comprised of highly-ordered and complex aromatic ring structures typically containing small amounts of hydrogen, nitrogen, oxygen, sulfur, and/or heavy metals in addition to their primary constituent, carbon. They are large, planar, hetero-atom containing molecules that lend themselves to pi-pi bond stacking. Asphaltenes are a distinct chemical component of asphalt, which can typically be isolated from the resins in asphalt or petroleum-based pitch due to their solubility by solvent extraction and other methods. They occur widely in heavy oil-producing formations, and are the non-melting (i.e., burns before melts) solid component of crude oil, giving such crude oils their color. For example, heavier, black-oil crudes, such as those found in tar or oil sands, will typically have a higher asphaltene content.

Asphaltenes are often described and defined based on their solubility. For instance, asphaltenes are soluble in toluene, tetrahydrofuran, and terpenes; however, they are insoluble in n-alkane solvents, such as n-pentane or n-heptane. Thus, asphaltenes may generally be isolated from heavy oils by recovering heavy residuum which is a byproduct left over from heavy oil upgrading. The heavy residuum is generally comprised of oil cuts, asphaltenes, and resin residues. The resins can be separated from the asphaltenes by dissolving the residuum in an n-alkane solvent and filtering out the asphaltenes. To then prepare the asphaltenes as a carbon fiber precursor, the asphaltenes must be dissolved in toluene, tetrahydrofuran, and terpenes, or the like. However, such dissolving and isolating processes are difficult, time-consuming, and expensive. Thus, to this point, isolating asphaltenes from the heavy oils in which they naturally suspended has not been widely utilized to form precursors for carbon fiber production.

SUMMARY

Embodiments of the present invention are broadly directed to methods of making carbon fibers from asphaltenes obtained from heavy oil upgrading. In particular, a method of the present invention includes the initial step of removing a liquid-phase asphaltene stream from a continuous coking reactor. The liquid-phase asphaltene stream is then introduced through a filter to yield a purified asphaltene stream. In the next step, the purified asphaltene stream is introduced through a spinneret to yield carbon-based filaments. The carbon-based filaments are then passed through an inert gas stream to yield a carbon-based fiber. The carbon-based fiber is then collected on a draw-down device, such as a wind-up spool.

Additional embodiments of the present invention are also directed to methods of making carbon fibers from asphaltenes obtained from heavy oil upgrading. In particular, an additional method of the present invention includes the initial step of removing a solid-phase asphaltene stream from a coking reactor. The solid-phase asphaltene stream is then introduced through a filter to yield a purified asphaltene stream. In the next step, the purified asphaltene stream is introduced through a spinneret to yield carbon-based filaments. The carbon-based filaments are then passed through an inert gas stream to yield a carbon-based fiber. The carbon-based fiber is then collected on a draw-down device, such as a wind-up spool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawings figures.

The drawing figures do not limit the invention to the specific embodiments described and disclosed herein. The drawings are not necessarily to scale, emphasis instead being placed on clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but not necessarily included. Thus, the present invention can include a variety of combinations and/or integrations of the embodiments described herein.

Figure 1:
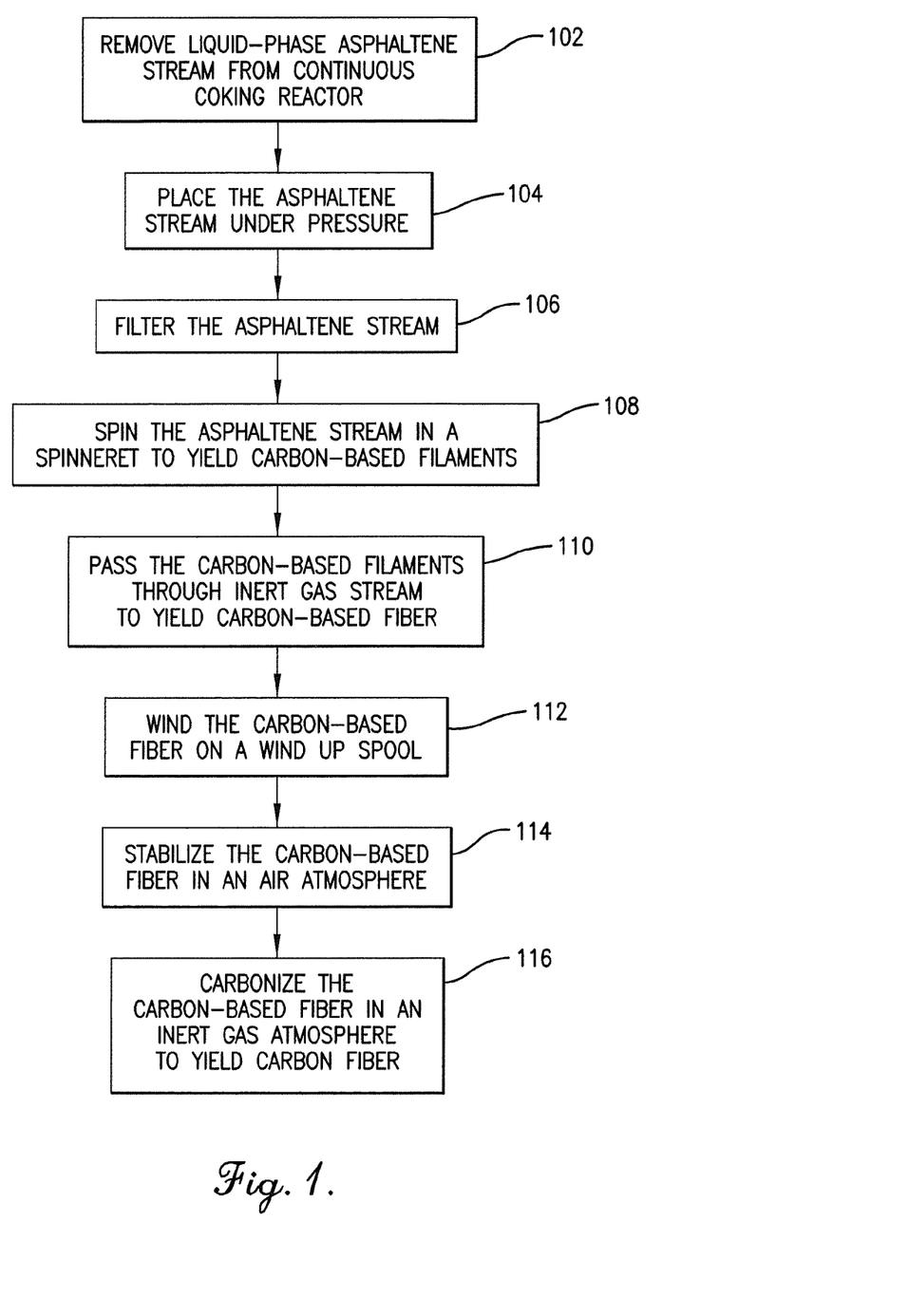
FIG. 1 is a flow chart depicting steps in one embodiment of a method of making carbon fibers from a liquid-phase asphaltene stream obtained from a continuous coking reactor.

Embodiments of the present invention are directed to methods of manufacturing carbon fibers from asphaltenes. In more detail, embodiments of the present invention are broadly directed to methods of making carbon fibers from asphaltenes obtained from heavy oil feedstocks undergoing upgrading. Steps in a method in accordance with exemplary embodiments of the present invention are depicted in FIG. 1 and begin with an initial step 102 of removing a liquid-phase asphaltene stream from a continuous coking reactor. Although the liquid-phase asphaltene stream may be obtained from a continuous coking reactor, additional embodiments may provide for an asphaltene stream to be obtained from other types of coking reactors, such as batch or fluidized bed reactors.

Coking reactors are typically used during final stages of heavy oil upgrading. In general, heavy oil upgrading is a process through which heavy oils are refined and/or upgraded into usable oils and gasses. An illustrative heavy oil upgrading process is provided in FIG. 2. After the heavy oil is mined, it is filtered to remove contaminates and heated before being sent to a flashtower (not shown). The flashtower applies extreme heat to the heavy oil, so as to induce chemical splitting of the heavy oil into various combustion gases, liquids, and residuum. The combustion gases need little other refining; however, the liquids and residuum can be further processed and refined. The liquids are sent to a fractionator 202, where the liquids are subject to additional heating that causes them to be further refined into combustion gases, usable oils, and heavy residuum. Heavy residuum is a common name for the thick, dark colored bituminous substance that remains after heavy oil upgrading. Heavy residuum is generally comprised of heavy oil cuts, resins, and asphaltenes. It is noted that heavy residuum may also be referred to in the art as petroleum pitch and/or mesophase pitch.

Figure 2:
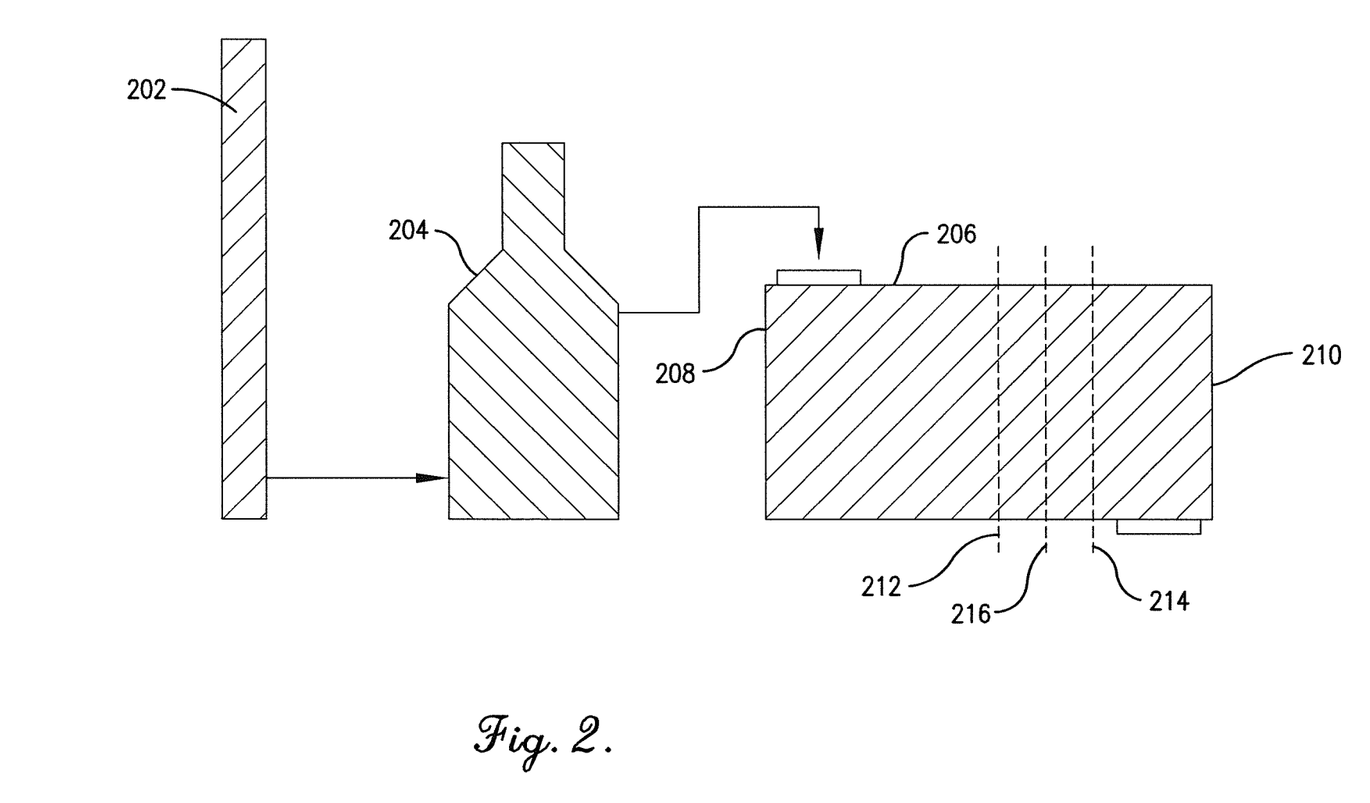
FIG. 2 is a schematic illustration of equipment that may be used in a heavy oil upgrading process.

From the fractionator 202, the heavy residuum may be sent to a residuum heater 204, where the heavy residuum is heated to between about 450° C. to about 550° C. at generally low pressure (i.e., approximately 15 psig). After heating, the heavy residuum is passed from the residuum heater 204 to a coking reactor 206. Embodiments of the present invention contemplate the use of coking reactors that accept various forms of heavy residuum leftover from multiple oil refining processes. For instance, the residuum left over from the initial flashtower refining process (not shown) may be sent to a vacuum tower (not shown) for further processing, and the heavy residuum resulting from the vacuum tower process may likewise be sent to the residuum heater 204 and thereafter to the coking reactor 206. Regardless of the source of the heavy residuum, the heat applied by the resdiuum heater 204 causes the initially semi-solid, tarry-like heavy residuum to reduce in viscosity, thus transitioning to a generally free-flowing liquid state.

Upon further heating by the residuum heater 204, the heavy residuum is provided to the coking reactor 206, where the high-temperature heavy residuum is kneaded and mixed, thus exposing a surface area of the heavy residuum to a vapor space that operates to discharge volatile compounds contained within residuum. As the heavy residuum travels through the coking reactor 206, it undergoes thermal cracking, which discharges volatiles compounds by separating combustion gases and other volatiles from the heavy residuum. Embodiments of the present invention contemplate the use of various types of coking reactors, including delayed, fluidized-bed, and continuous cokers. However, in embodiments of the present invention discussed in more detail below, the coking reactor 206 comprises a continuous coking reactor that continuously performs a kneading and mixing action on the residuum as the residuum travels through the reactor. The coking reactor 206 generally extends in a horizontal direction and accepts the heated heavy residuum through a first end 208 of the coking reactor. While within the coking reactor 206, new surface areas of the heavy residuum are continually exposed to the vapor space by the kneading and mixing action of the coking reactor. In particular, the coking reactor 206 kneads and mixes the heavy residuum, via actuating or rotating mixing members (not shown), while the residuum travels horizontally through the coking reactor from the first end 208 to a second end 210. The second end 210 may also be referred to as a discharge end because the heavy residuum that remains after traveling a length of the coking reactor 206 is discharged from the second end 210 of the coking reactor. The kneading and mixing action of the coking reactor 206 causes new surface areas of the heavy residuum to be continuously exposed to the vapor space several times per second, thus enhancing rapid mass transfer of the volatiles. The mass transfer of volatiles includes the volatization of the lower boiling point resins and oil cuts included in the heavy residuum. Therefore, as the heavy residuum travels through the coking reactor 206, it becomes increasingly rich in asphaltenes.

In addition, because the heavy residuum surface is continuously exposed to the vapor space, the coking reactor 206 provides for the volatization of the volatile oil cuts and resins in a very short amount of time (i.e., less than about 5 minutes). Such a short residence time allows for alkane side chains within the asphaltenes to remain intact because the side chains are not exposed to the vapor space long enough to crack. Alkane side chains promote asphaltene-asphaltene binding, which is beneficial during carbon fiber processing and production because it increases filament cohesion and fiber strength.

As the heavy residuum travels through the coking reactor 206 and as the volatiles and resins are separated from the heavy residuum, the heavy residuum begins to solidify from liquid-phase to a solid-phase (i.e., petroleum coke). The heavy residuum enters the first end 208 of the coking reactor 206 in a liquid phase and is removed at the second end 210, or discharge end, as a solid. Embodiments of the present invention provide for an asphaltene-rich feed stream to be removed from the coking reactor 206. Because the feed stream is rich in asphaltenes, the feed stream is hereinafter referred to as an asphaltene stream. In certain embodiments, such as depicted in step 102 of FIG. 1, the asphaltene stream is removed while in a liquid-phase. A liquid-phase asphaltene stream is beneficial because it can be directly processed into fiber without needing to be intermediately dissolved in a solution.

In certain embodiments, to obtain the liquid-phase asphaltene stream, the asphaltene stream may be removed from the coking reactor 206 before the heavy residuum solidifies but after the volatiles (i.e., oil cuts and resins) have been sufficiently volatized. Thus, as best illustrated by FIG. 2, the liquid-phase asphaltene stream may be removed from the coking reactor 206 at an extraction point positioned between a midpoint 212 (i.e., approximately midway between the first and second ends 208, 210) and the second end 210 of the coking reactor. More preferably, the liquid-phase asphaltene stream may be removed from the coking reactor 206 at an extraction point that lies approximately between the midpoint 212 and a three-quarter point 214 (i.e., approximately midway between the midpoint 212 and the second end 210) of the coking reactor. Even more preferably, the liquid-phase asphaltene stream may be removed from the coking reactor 206 at an extraction point that lies approximately between a five-eighths point 216 (i.e., approximately midway between the midpoint 212 and the three-quarter point 214) and the three quarter point 214 of the reactor. In certain embodiments of the present invention, the coking reactor 206 may include multiple extraction points, each positioned along the coking reactor 206 between the midpoint 212 and the second end 210. Because the asphaltene content and viscosity of the liquid-phase asphaltene stream increase as the heavy residuum travels through the coking reactor 206, such multiple extraction points may promote process flexibility by permitting access to liquid-phase asphaltene streams of varying asphaltene contents and viscosities, as necessary for specific carbon fiber processing requirements.

As just described, the liquid-phase asphaltene stream becomes increasingly rich in asphaltenes as the heavy residuum travels through the coking reactor 206. In certain embodiments it may be preferable to remove the liquid-phase asphaltene stream from the coking reactor 206 when the asphaltene content of the liquid-phase asphaltene stream is between about 40% to about 70%, based upon the total weight of the liquid-phase asphaltene stream taken as 100% by weight. More preferable, the liquid-phase asphaltene stream may be removed when the asphaltene content of the liquid-phase asphaltene stream is between about 60% to about 70% by weight. Even more preferable, the liquid-phase asphaltene stream may be removed when the asphaltene content of the liquid-phase asphaltene stream is between about 65% to about 70% by weight.

Figure 3:
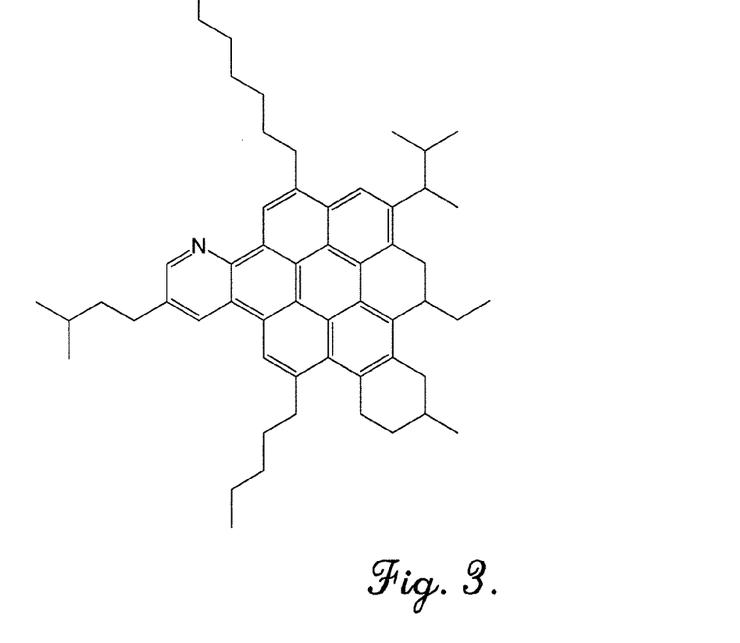
FIG. 3 is an idealized structure of an asphaltene according to one or more embodiments of the present invention.
Figure 4:
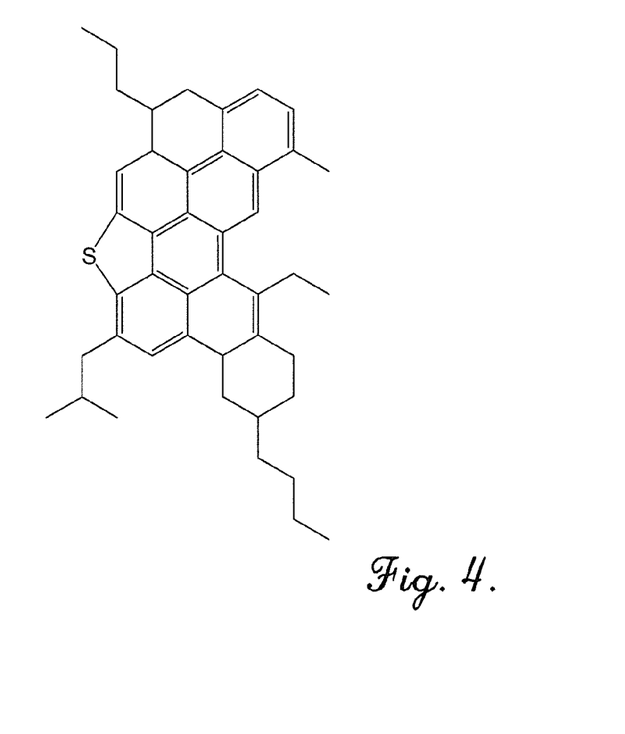
FIG. 4 is an idealized structure of an asphaltene according to one or more embodiments of the present invention.

Asphaltenes included in the asphaltene streams for use in one or more embodiments of the present invention are highly aromatic, planar molecules, and have the ability to pi stack. In general, asphaltenes are non-polymeric (i.e., discrete) molecules, as opposed to carbonaceous polymer networks such as graphite or carbon black. Asphaltenes are often defined based on their solubility characteristics. For instance, asphaltenes are insoluble in n-alkanes, such as n-pentane and/or n-heptane, and will preferably dissolve in toluene. The asphaltenes included in the asphaltene streams for use in one or more embodiments of the present invention will generally will have a hydrogen to carbon (H/C) ratio of less than about 1.4:1, preferably less than about 1.35:1, more preferably less than about 1.30:1, and even more preferably approximately equal to or less than about 1.2:1 (as determined by elemental analysis). The asphaltenes may have a weight average molecular weight of from about 200 Da to about 2500 Da, preferably from about 300 Da to about 2000 Da, and even more preferably from about 400 Da to about 1500 Da. The asphaltenes included in embodiments of the present invention may have a structure (or may include a portion having a structure) selected from the group consisting of structures shown in FIGS. 3-4.

In certain embodiments of the present invention the liquid-phase asphaltene stream may be removed from the coking reactor 206 by a pump mechanism, such as a screw pump, diaphragm pump, piston pump, or other similar type pump appropriate for processing high temperature materials, such as the liquid-phase asphaltene stream. In additional embodiments of the present invention, the liquid-phase asphaltene stream may be removed from the coking reactor 206 via a gravity assisted process. Such gravity assisted process may include providing one or more openings positioned adjacent to a bottom side of the coking reactor 206 and allowing the liquid-phase asphaltene stream to fall through the openings. The gravity assisted process may also include one or more mechanical valves connected to the one or more openings, such that the one or more mechanical valves can control the rate of removal of the liquid-phase asphaltene stream from the coking reactor 206. However, even if the liquid-phase asphaltene stream is removed without a pump mechanism, embodiments of the present invention include step 104, in which the liquid-phase asphaltene stream must be introduced to a pump and/or extruder mechanism. The pump and/or extruder mechanism of step 104 is required such that the liquid-phase asphaltene stream is placed under pressure before being passed through a filter and spinneret, as described in more detail below. The liquid-phase asphaltene stream may travel from the coking reactor 206 to the pump and/or extruder mechanism of step 104 via a pipe, channel, conveyor, auger, or other mechanism suitable for handling the liquid-phase asphaltene stream.

Once the asphaltene stream has been removed from the coking reactor 206 and placed under pressure via the pump or extruder mechanism, embodiments of the present invention include step 106, in which the liquid-phase asphaltene is passed through a filter. The liquid-phase asphaltene stream may travel from the pump and/or extruder mechanism of step 104 to the filter of step 106 via a pipe, metal flex hose, conduit or other mechanism suitable for handling the liquid-phase asphaltene stream. The filter is used to remove any impurities and/or ash content inherent in the heavy residuum and any additional impurities that may have been introduced to the heavy residuum by catalysts used during the refining process. The filter may include any common filter known in the art, such as sintered porous metal media, metal screen packs centrifuge-type filters, and/or electrostatic filters. In addition, the filter may be a stand-alone unit or included as part of a spinneret, which is described in more detail below.

After the asphaltene stream has been filtered of impurities, embodiments of the present invention include step 108, in which the liquid-phase asphaltene stream is passed through the spinneret. The liquid-phase asphaltene stream may travel from the filter of step 106 to the spinneret of step 108 via a pipe, metal flex hose, conduit or other mechanism suitable for handling the liquid-phase asphaltene stream. The spinneret produces carbon-based filaments from the liquid-phase asphaltene stream. Embodiments of the present invention contemplate the use of any type of spinneret commonly known and used in the art to form carbon-filaments and/or fibers. Generally, the spinneret includes a nozzle head that receives the liquid-phase asphaltene stream and an extrusion plate. The nozzle head may include a reservoir, chamber, plurality of bores, or similar holding area(s) to receive the liquid-phase asphaltene stream from the pump and/or extruder. The extrusion plate is commonly positioned on an end of the spinneret, opposite where the liquid-phase asphaltene stream is received. The extrusion plate generally includes a plurality opening of various sizes and shapes that correspond to intended sizes and shapes of the produced carbon-based filaments. From the nozzle head of the spinneret, the asphaltene stream is passed through the plurality of openings of the extrusion plate to form carbon-based filaments. In certain embodiments, the extrusion plate rotates with respect to the nozzle head, such that the carbon-based filaments that protrude from the plurality of openings wind around themselves, creating a wound carbon-based filament comprising multiple individual carbon-based filaments. In additional embodiments of the present invention, the liquid-phase asphaltene stream may not be spun, but may simply be extruded through the nozzle head and the one or more openings of the extrusion plate. Thus, the non-rotating extrusion plate may produce carbon-based filaments comprising one or more individual filaments.

Although the liquid-phase asphaltene stream is removed from the coking reactor 206 at temperatures between about 450° C. to about 550° C., it is understood that the asphaltene stream may undergo some cooling as it travels through the pump, filter, and spinneret. Depending on the process requirements, if the viscosity of the liquid-phase asphaltene stream becomes too high to pass through the spinneret, it may become necessary to apply heat to the pump, filter, and spinneret, so as to maintain the asphaltene stream in a liquid-phase for proper processing by the spinneret.

Upon the carbon-based filaments being formed from the spinneret, embodiments of the present invention include step 110, in which the filaments are subject to an inert gas cross-flow. The inert gas used in the cross-flow may include nitrogen, argon, or the like and is applied to the carbon-based filaments at a temperature between about 200° C. to about 400° C. The inert gas cross-flow assists the evaporation and cooling of the carbon-based filaments as they exit the spinneret, such that the filaments solidify to yield carbon-based fibers. Thereafter, the carbon-based fibers are collected and/or winded, via step 112, on a draw-down device. The draw-down device may include any type of filament and/or fiber collection apparatus that is commonly known in the art; however, in certain embodiments, the draw-down device may be a wind-up spool, which is a generally cylindrically-shaped body that rotates, so as to collect and wind-up the carbon-based fibers. In addition to collecting the carbon-based fibers, the draw-down device may apply a tension to the carbon-based fibers as the fibers are collected and wound. The tension may be varied by altering the speed at which the draw-down device collects or winds the carbon-based filaments. The tension may promote the alignment of carbon atoms within the fibers, so as to provide for increased tensile strength of the carbon fiber.

Upon winding the carbon-based fibers, embodiments of the present invention include step 114, in which the carbon-based fibers are subject to stabilization in an air atmosphere between about 200° C. to about 400° C. for several hours. The stabilization process oxidizes compounds within the carbon-based fibers to prevent relaxation and chain scissions within the filaments during carbonization, which will be discussed in more detail below. Embodiments of the present invention include step 116, in which the stabilized carbon-based fibers are carbonized by heating the stabilized carbon-based fibers to a temperature of between about 1000° C. to about 1500° C. in an inert atmosphere such as nitrogen, argon, or the like. Carbonization involves the gradual heating (typically in a furnace) of the carbon-based fibers up to about the desired temperature. In one or more embodiments, carbonization may be completed in less than about 24 hours. However, because the liquid-phase asphaltene stream used in embodiments of the present invention has such a high carbon content, the carbonization may be completed in significantly less than about 12 hours, and more preferably in less than 3 hours. Although carbonization is typically the most time-consuming and rate-limiting step in conventional carbon fiber manufacturing, the present method of embodiments of the present invention can be carried out much quicker due to a shorter carbonization dwell time period. During carbonization, non-carbon elements, such as hydrogen, oxygen, nitrogen, and sulfur, are driven from the asphaltene, in the form of $H_2$, $O_2$, $N_2$, gaseous HCN, HN, HS compounds, etc., yielding essentially a carbon fiber. Carbon-carbon bonds form between the asphaltene structures and the carbon fiber to form a homogeneous, high-strength monolithic structure. In addition, because the asphaltene stream preferably has a low H/C ratio, off-gassing is reduced and the yield rate of carbon fiber (by weight) from the liquid-phase asphaltene stream is high.

In other words, with conventional carbon fiber precursors (e.g., PAN), about 50% of the precursor mass is burned off during carbonization, potentially leaving behind substantial voids in the fibers. In addition, mesophase pitch-based fibers contain significant resinous components, primarily carboxylic and naphthenic acids which generate oxygen and hydrogen, along with other non-carbon elements that must be removed, including nitrogen and sulfur. This volatilization creates bubbles, and channels throughout the fibers as the gases form and escape, thus reducing the density of the fibers. As such, conventional precursors are often unstable and generate fibers with a plurality of voids. By contrast, the formation of carbon fibers from liquid-phase asphaltene streams obtained via embodiments of the present invention have a more monolithic structure, resulting in stronger carbon fibers.

In addition to the method of embodiments described above for liquid-phase asphaltene streams, additional embodiments of the present invention may include creating carbon fibers from solid-phase asphaltene streams. As described above, the heavy residuum converts from liquid-phase to solid-phase as it travels through the continuous coking reactor 206. The solid-phase residuum is extremely rich in asphaltenes because by the time the residuum has reached the second end 210 (i.e., the discharge end), much of the volatiles, including oil cuts and resins, have been volatized by continuous exposure to the vapor space. In certain embodiments, the asphaltene content of the solid-phase asphaltene stream removed from the coking reactor 206 is between about 60% to about 90% by weight. More preferable, the asphaltene content of the solid-phase asphaltene stream is between about 80% to about 90% by weight. Even more preferable, the asphaltene content of the solid-phase asphaltene stream is between about 85% to about 90% by weight.

To produce carbon fibers from a solid-phase asphaltene stream, the asphaltene stream must generally be converted to liquid or semi-liquid form. In certain embodiments of the present invention, the solid-phase asphaltene stream may be directly spun or extruded through a spinneret by placing the solid-phase asphaltene stream under extremely high pressure before being introduced to a spinneret. However, in additional embodiments of the present invention, the solid-phase asphaltene stream may be dissolved in a solvent, yielding an asphaltene-rich solution, which can then be spun via a spinneret. Because the process of placing the solid-phase asphaltene stream under extremely high pressure and directly spinning it without first being formed into a solution is similar to the steps provided above for the liquid-phase asphaltene stream, it will not be repeated here. Instead, the following steps described below are directed to methods for creating carbon fiber from a solid-phase asphaltene stream that has been dissolved into a solution.

Figure 5:
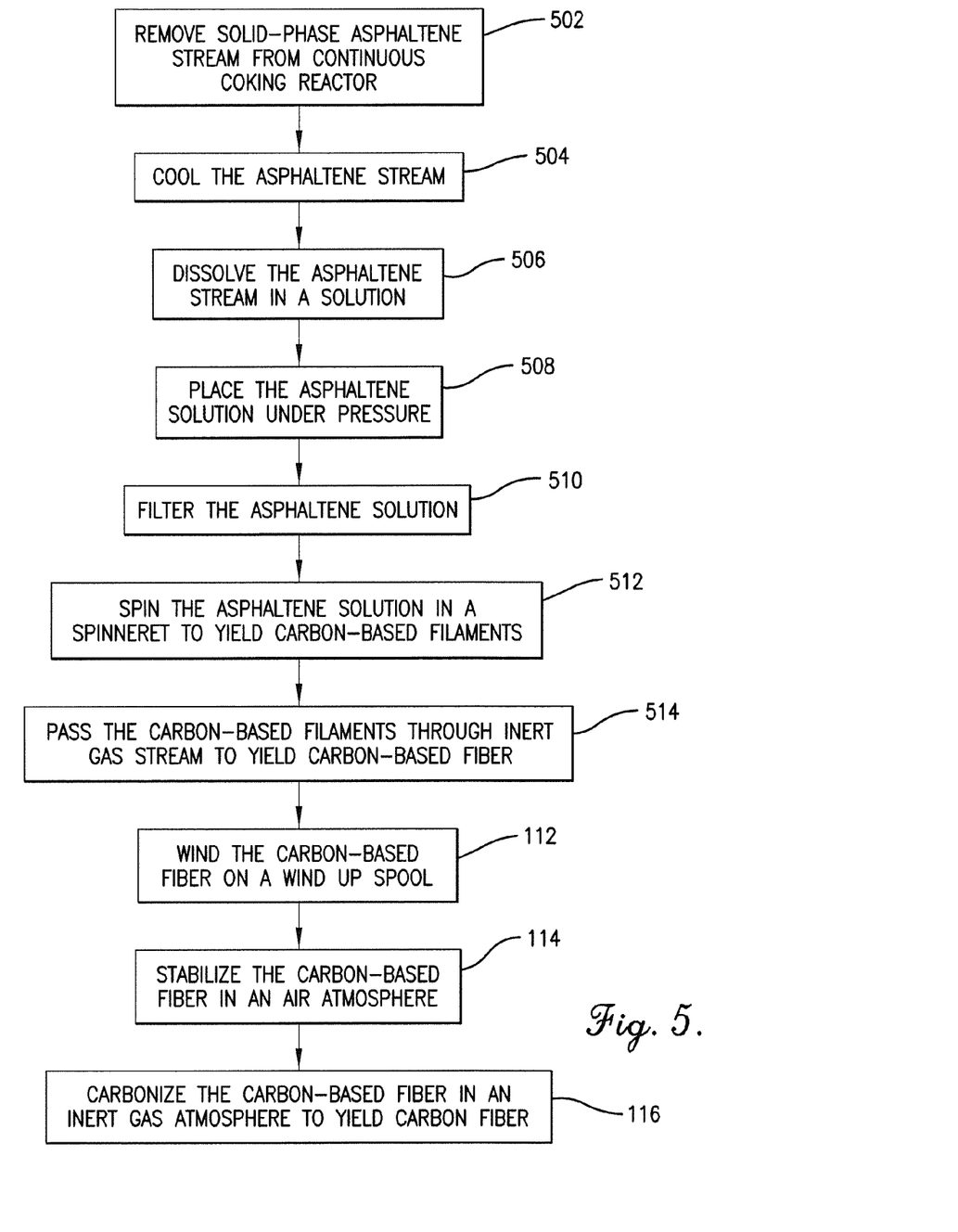
FIG. 5 is a flow chart depicting steps in one embodiment of a method of making carbon fibers from a solid-phase asphaltene stream obtained from a continuous coking reactor.

Steps in a method in accordance with other exemplary embodiments of the present invention are depicted in FIG. 5. Step 502 provides for a solid-phase asphaltene stream to be removed from the coking reactor 206. In embodiments that provide for the removal of solid-phase asphaltene streams, the asphaltene stream is removed from the coking reactor 206 at the second end 210 (i.e., the discharge end) of the reactor. In certain embodiments the asphaltene stream may be removed from the coking reactor 206 by a pump mechanism that is suitable for handling solid-phase, high-temperature material, such as a screw pump. In additional embodiments, the asphaltene stream may simply be removed from the coking reactor 206 via gravity assisted process, such as providing an opening at the second end 210 of the coking reactor and allowing the solid-phase asphaltene stream to fall down through the opening. The opening may also include a mechanical valve connected to the opening, such that the mechanical valve controls the rate of removal of the solid-phase asphaltene stream from the coking reactor 206. Once the solid-phase asphaltene stream has been removed from the coking reactor 206, embodiments of the present invention include step 504, in which the solid-phase asphaltene stream is cooled. Because the temperature of the solid-phase asphaltene is between about 450° C. to about 550° C. as it exits the coking reactor 206, it must be cooled before being mixed with a solvent. In certain embodiment, the solid-phase asphaltene stream may be passed through a heat exchanger where excess heat is removed and passed on to other components of the refining process. However, in other embodiments, the solid-phase asphaltene stream may simply be left to cool naturally before being dissolved in a solvent. The solid-phase asphaltene stream may travel from the coking reactor 206 to the cooling step 504 via a pipe, channel, conveyor, or other mechanism suitable for handling the solid-phase asphaltene stream.

Once the solid-phase asphaltene stream has been cooled, embodiments of the present invention include step 506, in which the solid-phase asphaltene stream is dissolved in a solvent, yielding an asphaltene solution, before being provided to the spinneret. The solid-phase asphaltene stream may travel from the cooling step 504 to the dissolving step 504 via a pipe, channel, conveyor, or other mechanism suitable for handling the solid-phase asphaltene stream. Suitable solvents for use with the solid-phase asphaltene stream include carrier solvents such as benzene, toluene, tetrahydrofuran, terpenes (e.g., d-limonene and alpha-pinene), and mixtures thereof, although it is understood that many other solvents may be suitable for use in one or more embodiments depending on the temperature of the solid-phase asphaltene stream. In one or more embodiments, the solid-phase asphaltene stream is mixed with the solvent under ambient conditions (~25° C., ~760 mmHg) until a homogenous solution or dispersion is formed, although it is understood that higher concentrations of asphaltenes in a given solvent may be achieved at elevated temperatures, which may be more suitable for industrial carbon fiber production processes. The solution or dispersion preferably comprises from about 5% to about 60% by weight asphaltenes, based upon the total weight of the solution or dispersion taken as 100% by weight.

Once the solid-phase asphaltene stream has been dissolved in the solution, embodiments of the present invention include step 508, in which the asphaltene solution is placed under pressure via a pump or extruder mechanism. The asphaltene solution may travel to the pump or extruder mechanism of step 508 via a pipe, hose, conduit or other mechanism suitable for handling the asphaltene solution. Step 508 may include typical pumps known in the art, such as screw pumps, diaphragm pump, piston pump, centrifugal pumps, turbine pump, or the like. Thereafter, embodiments of the present invention include step 510, in which the asphaltene solution is passed through a filter to remove any impurities and/or ash content that are inherent in the heavy oil and additional impurities that may have been added to the heavy residuum from catalysts during the refining process. The asphaltene solution may travel from the pump or extruder mechanism of step 508 to the filter of step 510 via a pipe, hose, conduit or other mechanism suitable for handling the asphaltene solution. The filter of step 510 may include sintered porous metal media, fine metal mesh screen, centrifuge-type filters, and/or electrostatic filters. In addition, the filter may be a stand-alone unit or included as part of a spinneret, which is described in more detail below.

After the asphaltene solution has been filtered of impurities, embodiments of the present invention include step 512, in which the asphaltene solution is passed through the spinneret, where it is converted to carbon-based filaments. The spinneret process for the solution is similar to that as discussed above for the liquid-phase asphaltene stream. However, once the solution is spun through the spinneret and exits the extrusion plate, thus forming carbon-based filaments, embodiments of the present invention include step 514, in which an inert gas cross-flow operates to evaporate the solvent from the asphaltene solution. Once the solvent has been evaporated from the asphaltene solution, the remaining material is carbon-based fibers. Because the solid-phase asphaltene stream and the asphaltene solution were cooled, via step 504, the inert gas used in the inert gas cross-flow may be maintained at ambient conditions. However, in certain embodiments, the inert gas cross-flow may be maintained at temperature between about 200° C. to about 400° C. to assist with evaporation of the solvent and solidification of the carbon-based filaments. In addition, concurrent and countercurrent inert gas streams may be used with or in place of cross-flow gas streams. The remaining processes necessary to yield carbon fiber from the solid-phase asphaltene stream are the similar, or the same, as were required for the carbon fibers based on the liquid-phase asphaltene stream (i.e., winding step 112, stabilization step 114, and carbonization, step 116).

The carbon fibers from embodiments of the present invention have a high thermal resistance and high tensile strengths. Carbon fibers manufactured according to one or more embodiments of the present invention may be used to make various articles of manufacture including, without limitation, nose cones for missiles, commercial and military aircraft disc brakes, automotive high performance disc brakes, atmosphere re-entry vehicle heat shields, missile guidance vanes, high performance and light weight aircraft, aerospace, or automotive structural and/or powertrain components and/or parts, and other composite parts requiring high strength and high thermal resistance.

Additional advantages of the various embodiments of the present invention will be apparent to those skilled in the art upon review of the disclosure herein. For example, because the asphaltene stream may be removed from the coking reactor in a liquid-phase, the asphaltene stream does not need to be dissolved nor does additional heat need to be applied to it before being spun into carbon-based filaments and/or fibers via the spinneret. It will be appreciated that the various embodiments described herein are not necessarily mutually exclusive unless otherwise indicated herein. For example, a feature described or depicted in one embodiment may also be included in other embodiments, but is not necessarily included. Thus, the present disclosure encompasses a variety of combinations and/or integrations of the specific embodiments described herein. Although the invention has been described with reference to the exemplary embodiments illustrated in the attached drawings, it is noted that equivalents may be employed and substitutions made herein without departing from the scope of the invention as recited in the claims.

We claim:

1. A method of making carbon fibers from asphaltenes obtained from heavy oil upgrading, the method comprising:
    mixing a liquid-phase asphaltene stream as the asphaltene stream travels horizontally from a first end of a continuous coking reactor towards a second end of the continuous coking reactor, wherein the mixing of the asphaltene stream is performed via actuating mixing members continuously exposing new surface areas of the asphaltene stream to vapor space within the continuous coking reactor, thereby enhancing mass transfer of volatiles from the asphaltene stream, wherein the mass transfer of volatiles includes a volatization of lower boiling point resins and oil cuts so as to increase an asphaltene content of the asphaltene stream;
    removing the liquid-phase asphaltene stream from the continuous coking reactor, wherein the liquid-phase asphaltene stream comprises between about 40% to about 70% asphaltenes by weight;
    introducing the liquid-phase asphaltene stream through a filter to yield a purified asphaltene stream;
    introducing the purified asphaltene stream through a spinneret to yield carbon-based filaments;
    passing the carbon-based filaments through an inert gas stream to yield a carbon-based fiber; and
    collecting the carbon-based fiber on a draw-down device.

2. The method of claim 1, wherein the liquid-phase asphaltene stream comprises about 60% to about 70% asphaltenes, based upon a total weight of the liquid-phase asphaltene stream taken as 100% by weight.

3. The method of claim 1, further including a step of oxidizing the carbon-based fiber in an air atmosphere between about 200° C. to about 400° C. to yield a stabilized carbon-based fiber.

4. The method of claim 3, further including a step of carbonizing the stabilized carbon-based fiber in an inert gas atmosphere between about 1000° C. to about 1500° C. to yield carbon fiber.

5. The method of claim 1, wherein the collecting the carbon-based fiber step further including applying a tension to the carbon-based fiber as the carbon-based fiber is collected on the draw-down device.

6. The method of claim 1, wherein the liquid-phase asphaltene stream is removed from the coking reactor at a temperature between about 450° C. to about 550° C.

7. A method of making carbon fibers from asphaltenes obtained from heavy oil upgrading, the method comprising:
    converting a liquid-phase asphaltene stream into a solid-phase asphaltene stream by mixing the asphaltene stream as the liquid-phase asphaltene stream travels horizontally from a first end of a continuous coking reactor to a second end of the continuous coking reactor, wherein the mixing is performed via actuating mixing members continuously exposing new surface areas of the asphaltene stream to vapor space within the continuous coking reactor, thereby enhancing mass transfer of volatiles from the asphaltene stream, wherein the mass transfer of volatiles includes a volatization of lower boiling point resins and oil cuts so as to increase an asphaltene content of the asphaltene stream;
    removing the solid-phase asphaltene stream from the second end of the continuous coking reactor;
    introducing the asphaltene stream through a filter to yield a filtered asphaltene stream;
    introducing the filtered asphaltene stream through a spinneret to yield carbon-based filaments;
    passing the carbon-based filaments through an inert gas stream to yield a carbon-based fiber; and
    collecting the carbon-based fiber on a draw-down device.

8. The method of claim 7, wherein the solid-phase asphaltene stream comprises about 60% to about 90% asphaltenes, based upon a total weight of the solid-phase asphaltene stream taken as 100% by weight.

9. The method of claim 7, wherein the solid-phase asphaltene stream comprises about 80% to about 90% asphaltenes, based upon a total weight of the solid-phase asphaltene stream taken as 100% by weight.

10. The method of claim 7, further including a step of cooling the solid-phase asphaltene stream.

11. The method of claim 10, further including a step of dissolving the solid-phase asphaltene stream in a solvent to yield an asphaltene solution.

12. The method of claim 11, wherein the inert gas stream is operable to solidify the asphaltene solution into a carbon-based filament by causing the solvent to evaporate.

13. The method of claim 12, wherein the solvent is selected from the group consisting of toluene, tetrahydrofuran, terpenes, and mixtures thereof.

14. The method of claim 7, further including a step of oxidizing the carbon-based fiber in an air atmosphere between about 200° C. to about 400° C. to yield a stabilized carbon-based fiber.

15. The method of claim 14, further including a step of carbonizing the stabilized carbon-based fiber in an inert gas atmosphere between about 1000° C. to about 1500° C. to yield carbon fiber.

16. The method of claim 7, wherein the collecting the carbon-based fiber step further includes applying a tension to the carbon-based fiber as the carbon-based fiber is collected on the draw-down device.

17. The method of claim 7, wherein the solid-phase asphaltene stream is removed from the coking reactor at a temperature between about 450° C. to about 550° C.

18. A method of making carbon fibers from asphaltenes obtained from heavy oil upgrading, the method comprising:
   mixing a liquid-phase asphaltene stream as the asphaltene stream travels horizontally from a first end of a continuous coking reactor towards a second end of the continuous coking reactor, wherein the mixing of the asphaltene stream is performed via actuating mixing members continuously exposing new surface areas of the asphaltene stream to vapor space within the continuous coking reactor, thereby enhancing mass transfer of volatiles from the asphaltene stream, wherein the mass transfer of volatiles includes a volatization of lower boiling point resins and oil cuts so as to increase an asphaltene content of the asphaltene stream;
   obtaining the liquid-phase asphaltene stream from the continuous coking reactor,
   wherein an inlet of the continuous coking reactor is positioned at the first end of the reactor, and wherein an outlet for the liquid-phase asphaltene stream is positioned between a midpoint of the reactor and midway between the midpoint and the second end of the reactor;
   processing the liquid-phase asphaltene stream through a filter to yield a filtered asphaltene stream;
   processing the filtered asphaltene stream to yield carbon-based filaments;
   processing the carbon-based filaments to yield a carbon-based fiber;
   collecting the carbon-based fiber;
   processing the carbon-based fiber to yield a stabilized carbon-based fiber; and
   processing the stabilized carbon-based fiber to yield carbon fiber.

19. The method of claim 18, wherein the liquid-phase asphaltene stream comprises about 40% to about 70% asphaltenes, based upon a total weight of the liquid-phase asphaltene stream taken as 100% by weight.

* * * * *